United States Patent [19]
Bone

[11] 3,987,607
[45] Oct. 26, 1976

[54] POWER CUTTING MEANS
[76] Inventor: Ted E. Bone, P.O. Box 44, Pineville, Mo. 64856
[22] Filed: Feb. 20, 1975
[21] Appl. No.: 551,352

[52] U.S. Cl. .................................. 56/16.2; 56/295
[51] Int. Cl.² ........................................ A01D 35/00
[58] Field of Search ............... 56/295, 255, 6, 11.9, 56/13.6, 13.7, 13.8, 16.2

[56] References Cited
UNITED STATES PATENTS

| | | | |
|---|---|---|---|
| 262,637 | 8/1882 | Blanchard | 56/295 |
| 604,189 | 5/1898 | Davis | 56/295 |
| 640,587 | 1/1900 | Pollock | 56/295 |
| 969,817 | 9/1910 | Weathern | 56/295 |
| 1,536,514 | 5/1925 | Mehls | 56/295 |
| 2,673,437 | 3/1954 | Pollock et al. | 56/11.9 |
| 2,777,272 | 1/1957 | Smith et al. | 56/13.6 X |
| 3,469,378 | 9/1969 | Heesters et al. | 56/11.9 |

FOREIGN PATENTS OR APPLICATIONS

| | | | |
|---|---|---|---|
| 46,227 | 11/1917 | Sweden | 56/295 |

Primary Examiner—Russell R. Kinsey

[57] ABSTRACT

This invention relates to a power cutting means normally mounted on a tractor structure for support and receives power therefrom through a power take-off shaft. The power cutting means includes a support and connector means attachable to the tractor structure; a power drive means mounted on the support and connector means; and a cutter means connected to the power drive means for cutting operation thereof. The cutter means includes a basic support assembly having a cutter assembly mounted thereon and partially enclosed by a housing assembly. The housing assembly includes first guard and divider members and second guard and divider members mounted on the basic support assembly. The cutter assembly includes a drive assembly connected to the power drive means and operably connected to a blade assembly. The blade assembly includes a plurality of blade members rotatable in a horizontal plane and movable through the first and second guard and divider members to achieve the cutting action of this invention with adjacent blade members moving in opposite direction of rotation.

6 Claims, 7 Drawing Figures

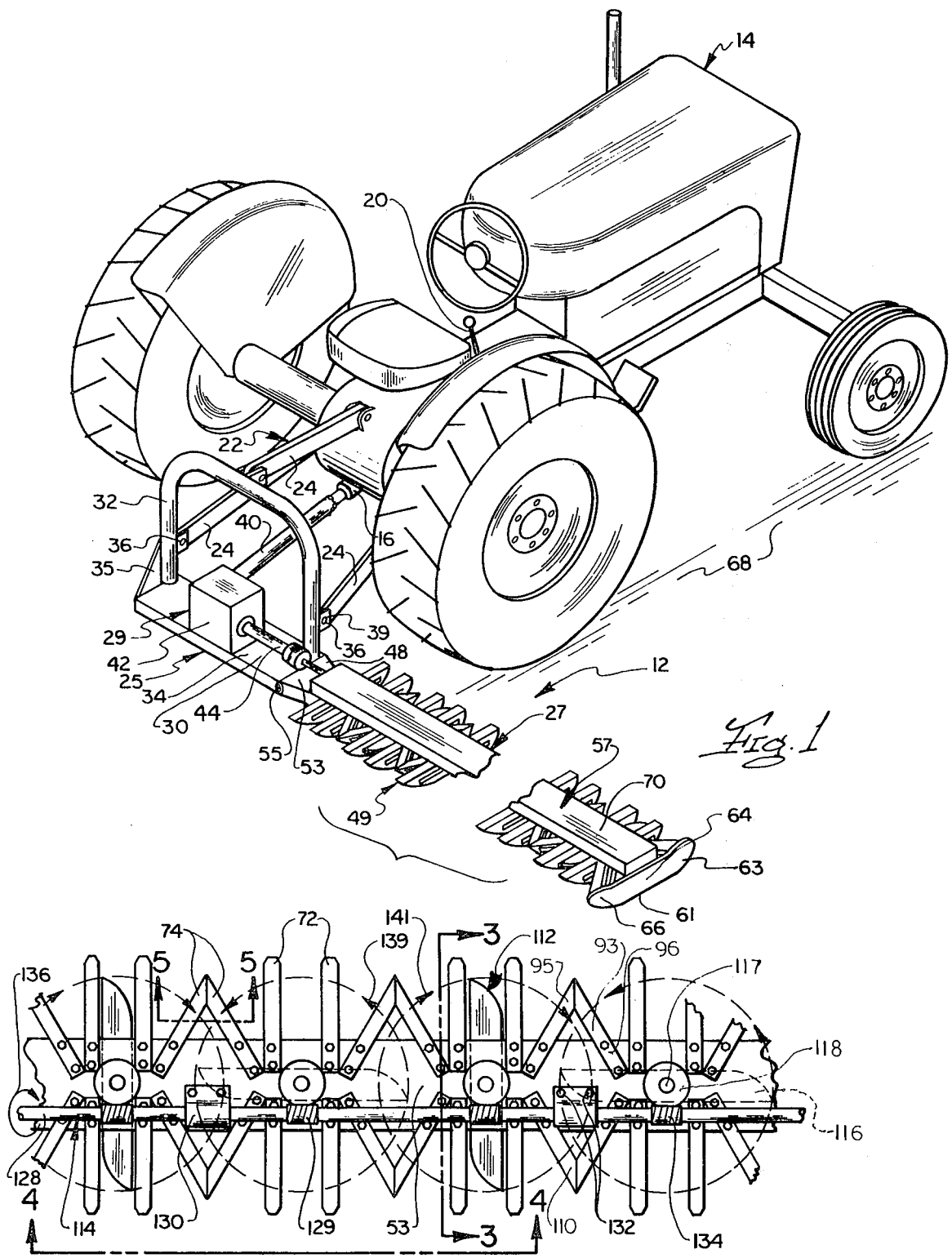

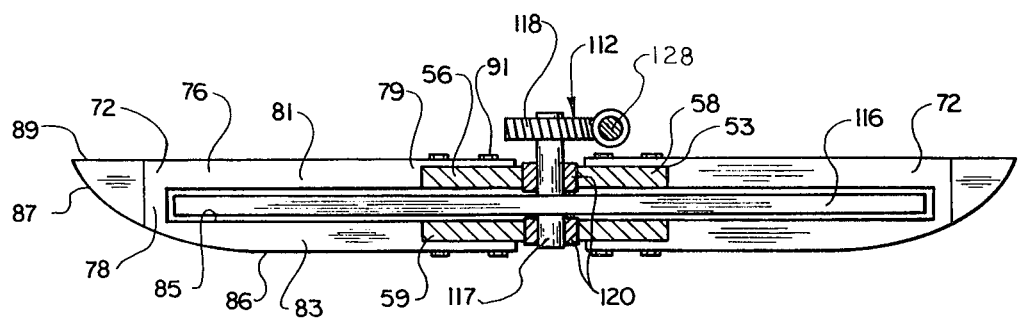
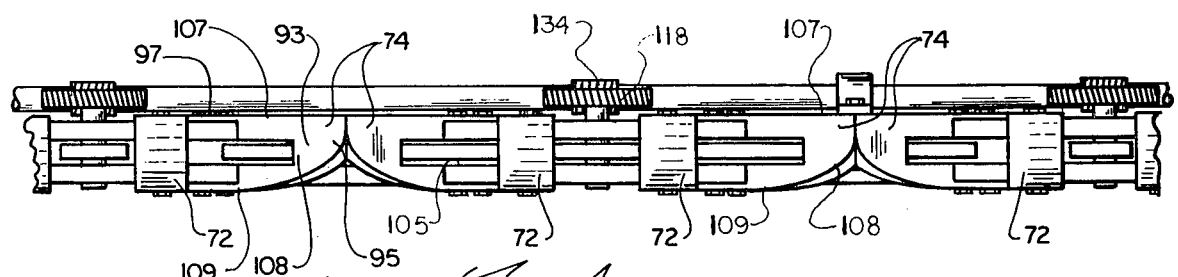
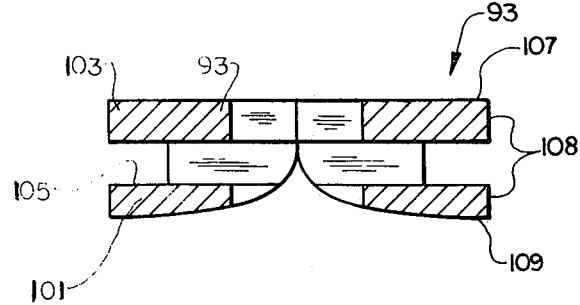
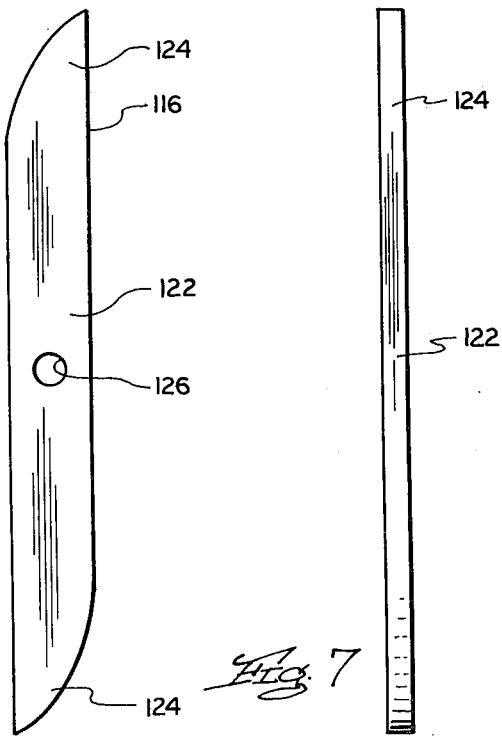

POWER CUTTING MEANS

Numerous types of cutting structures are known to the prior art having laterally movable blade structures or having a mower member movable about a horizontal axis but they are not operable similar to the applicant's invention. The prior art mower or cutter structures require substantial power input to achieve the cutting action and are readily subject to damage from rocks and other such hidden articles. Additionally, the prior art cutting structures are complicated in structure and costly to manufacture.

In one preferred embodiment of this invention, a power cutting means is provided which is readily attachable to a tractor structure. The tractor structure is of a conventional nature having a power take-off shaft and a three point hitch assembly which is hydraulically actuated in a conventional manner. The power cutting means includes a support and connector means; a cutter means connected to the support and connector means; and a power drive means mounted on the support and connector means and operably connected to the power take-off shaft and the cutter means. The support and connector means includes a support assembly having a connector bar mounted thereon. The support assembly includes a horizontally extended base plate having a gusset plate connected thereto and additionally secured to the connector bar for rigidity. The connector bar is of a generally U-shaped construction having a plurality, namely, three pairs of laterally extended lug members operable through bolt members to be connected to the three point hitch assembly of the tractor structure for moving the entire support and connector means in tilting and vertical directions as desired. The power drive means includes a main gear box securely mounted on the support assembly and having laterally extended therefrom, in one direction, an input shaft which is operably connected to the power take-off shaft and, in another direction, a laterally extended output shaft which is operably connected to the cutter means. The input shaft is connected to the power take-off shaft through a universal joint type connection and the main gear box is operable to transfer power to the cutter means. The cutter means includes a basic support assembly connected to the support and connector means; a cutter assembly mounted on the basic support assembly; and a housing assembly operable to partially enclose the cutter assembly. The basic support assembly includes an elongated support plate which is pivotally connected at one end through a connector pin to the support and connector means. The elongated support plate includes a main body having a top wall, a bottom wall, and end walls to receive a portion of the cutter assembly therein. Additionally, an outer one of the end walls has a support runner thereon adapted to contact a support surface during operation. The housing assembly includes a main cover member operable to cover a portion of the cutter assembly and first and second guard and divider members. The first guard and divider members are of a generally C-shape, each having a body section with outer curved end portions and inclined connector end portions. The second guard and divider members are each provided with an inclined body loop section having an outer pointed end portion and inner connector portions. The connector end portions and the connector portions are secured as by bolt members to the elongated support plate. The cutter assembly includes a blade assembly connected to a drive assembly, both of which are mounted on the basic support assembly. The blade assembly includes a main blade member mounted between slots in the first and second guard and divider members, a blade support shaft connected to the blade member for rotation thereof, and a driven gear member mounted on an upper portion of the blade support shaft. The drive assembly includes a universal joint member operably connected to the output shaft of the power drive means and the other end connected to a driven shaft member having a worm gear assembly mounted thereon, and a plurality of support connectors to anchor the driven shaft member to the basic support assembly while allowing rotation thereof. The worm gear assembly includes a plurality of spaced worm gears, each one operably associated with the respective ones of the driven gear members of the blade assembly for operation thereof. Adjacent one's of the worm gears and cooperating driven gear members are such to cause rotation of the respective interconnected blade members in opposite directions so as to have an inter action therebetween and cutting action with the first and second guard and divider members.

One object of this invention is to provide a power cutting means which is readily attachable to a tractor structure and having a plurality of cooperating rotating blade members relative to first and second guard and divider members to achieve an efficient and effective shearing action for cutting grass, hay, alfalfa, etc. with a minimum amount of power required.

One further object of this invention is to provide a power cutting means attachable to a tractor structure which is operable regardless of direction of tractor movement and being of rigid construction to resist damage due to rocks or other such articles encountered in normal cutting or mowing operations.

One other object of this invention is to provide a power cutting means having a support and connector means readily attachable to a three point hitch assembly on a tractor structure and to receive power through a power take-off shaft plus having cutter means driven through a power drive means with a plurality of cutter blade members rotatable about individual vertical shafts to rotate in horizontal planes for efficient cutting action.

More particularly, this invention relates to a power cutting means having a cutter means provided with a plurality of spaced blade members rotatable in intermeshed relationship and operably associated with first and second guard and divider members which cooperate to achieve a shearing action with the respective blade members in an efficient and effective operation.

Still, one further object of this invention is to provide a power cutting means connectable to a tractor structure which is durable in construction, economical to manufacture, efficient in cost of operation, superior cutting action, and simple in operation.

Various other objects, advantages, and features of the invention will become apparent to those skilled in the art from the following discussion, taken in conjunction with the accompanying drawings, in which:

FIG. 1 is a perspective view of a tractor structure having a power cutting means of this invention attached thereto;

FIG. 2 is a fragmentary top planned view of a cutter means of the power cutting means of this invention having portions thereof removed for clarity;

FIG. 3 is an enlarged sectional view taken along line 3—3 in FIG. 2;

FIG. 4 is a fragmentary side elevational view taken along line 4—4 in FIG. 4;

FIG. 5 is a fragmentary sectional view taken along line 5—5 in FIG. 2;

FIG. 6 is a top plan view of a blade member of the power cutting means of this invention; and FIG. 7 is a side view of the blade member as shown in FIG. 5.

The following is a discussion and description of preferred specific embodiments of the new power cutting means of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a power cutting means, indicated generally at 12, is shown as attached to a generally conventional tractor structure 14. The tractor structure 14 is provided with a power take-off shaft 16 having a universal joint connector member mounted thereon which is adapted to be connected to the power cutting means 12 to provide the desired power. Control handles 20 on the tractor structure 14 are operable to regulate the output speed of the power take-off shaft 16 in a conventional manner. Additionally, the tractor structure 14 is provided with parallel linkage arms 24 which are operable under hydraulic pressure through the control handles 20 to move the entire power cutting means 12.

The power cutting means 12 includes a support and connector means 24 attachable to the tractor structure 14; a cutter means 27 connected to the support and connector means 25; and a power drive means 29 mounted on the support and connector means 25 and operably connected to the power take-off shaft 16 and the cutter means 27 for operation thereof as will be explained. The support and connector means 25 includes a main support assembly 30 having a connector bar 32 secured thereto.

As shown in FIG. 1, the main support assembly 30 includes a base plate 34 of rectangular shape having a gusset plate 35 secured thereto and anchored to the connector bar 32 for rigidity. The base plate 34 serves as a rigid support element to hold the power drive means 29 thereon and the connector bar 32 for attachment to the tractor structure 14. The connector bar 32 is of a tubular construction of generally U-shape having lower ends secured as by welding to the base plate 34 and, extended forwardly therefrom, three pairs of laterally extended lug members 36. The pairs of parallel lug members 36 have aligned holes therein to receive respective bolt members 39 for connecting to the linkage arms 24 of the three point hitch assembly 22. This provides for a secure attachment of the support and connector means 25 to the tractor structure 14 while operable to move the entire power cutting means 12 to desired cutting positions.

The power drive means 29 includes an input shaft 40 having at one end connected through the universal joint connector member to the power take-off shaft 16; the input shaft 40 is connected to a main gear box 42 mounted on the base plate 34; and an output shaft 44 is connected to the main gear box 42 and the cutter means 27. The main gear box 42 is provided with a plurality of internal gear members operable to achieve the desired power and rotational speed relative to that received from the power take-off shaft 16. The output shaft 44 is provided with a universal universal joint connector at the outer end for connecting to the cutter means 27.

The cutter means 27 includes a basic support assembly 48 having a cutter assembly 49 connected thereto and a housing assembly 51 to enclose the cutter assembly 49. The basic support assembly 48 includes an elongated support plate 53 having one end connected as by a connector pin 55 to the base plate 34 of the support and connector means 25 for pivotal movement for reasons to be explained.

The elongated support plate 53 includes a main body 56 having a top wall 58, a bottom wall 59, and outer end walls 61 to achieve a rigid structure. An outer end wall 61 is secured to a support runner 63. The inner end of the support plate 53 is pivotally connected to the main base plate 34 and allows the entire main body 56 to be pivoted thereabout which is desirable when used on rough terrain as will be explained.

The support runner 63 resembles a sled runner having a main central section 64 with curved outer end portions 66 on opposite ends thereof. The support runner 63 is parallel to the normal direction of travel of the power cutting means 12 to hold same above a support surface 68.

The housing assembly 51 includes 1) a cover member 70 mounted on the elongated support plate 53 to cover a portion of the cutter means 27; and 2) guard means including first and second guard and divider members 72 and 74, respectively, which are operable to guard a portion of the cutter assembly 49. More particularly, the cover member 70 is of a generally U-shape in transverse cross section and extends substantially the length of the elongated support plate 53, being operable to keep foreign material out of the cutter assembly 49 for obvious reasons. The cover member 70 is hinged to the support plate 53 for ease of maintenance purposes.

As shown in FIG. 3, the first guard and divider member 72 is of a generally U-shape having a main body section 76 with an outer pointed end section 78 and an inner connector section 79. The main body section 76 has upper and lower plates 81, 83 forming a blade slot 85 therebetween. The outer pointed end section 78 resembles a knife-like structure having a flat bottom surface 86 integral with upperwardly inclined surface 87 and a flat top surface 89. The end section 78 resembles a sled-runner structure for ease of operation as will be explained. The inner connector section 79 is provided with upper and lower aligned holes to receive bolt members 91 therein for securing through similar aligned holes in the top wall 58 and bottom wall 59 of the elongated support plate 53 for securing thereto. It is noted that two of the first guard and divider members 72 are placed adjacent and extended opposite each other from the elongated support plate 53 so that pairs thereof cooperate as will be explained.

The second guard and divider members 74 are similar to the first guard and divider members 72, each having a main body loop section 93 with outer pointed end portion 95 integral with an inner connection portion 96. Each connector portion 96 is provided with a pair of aligned holes to be attached to the top wall 58 and bottom wall 59 of the support plate 53 by bolt members 97. The main body loop section 93 has upper and lower walls 101, 103 forming a blade slot 105 therebetween. Each outer pointed end portion 95 includes a top flat surface 107 integral with an inclined blade surface 108 which, in turn, is integral with a flat bottom surface 109 similar to the first guard and divider member 72.

As noted in FIG. 2, the top flat surface 107 has the outer end formed with a trianglar pointed portion 110 operable to cooperate with an adjacent second guard and divider member 74 whereby, together, they form a pointed material separation element. It is seen that pairs of the cooperating second guard and divider members 74 are provided on opposite sides of the elongated support plate 53 of the basic support assembly 48 so that the entire power cutting means 12 is operable regardless of the direction of movement.

The cutter assembly 49 includes a blade assembly 112 connected to the elongated support plate 53 and a drive assembly 114 connected to the support plate 53 and the power drive means 29. As shown in FIG. 2, the blade assembly 112 includes a blade member 116 connected through a blade support shaft 117 to a driven gear member 118. The driven gear member 118 is mounted above the top wall 58 of the support plate 53 and secured on the upper end of the blade support shaft 117. The driven gear member 118 is operably connected to the drive assembly 114. The central and lower end of the blade support shaft 117 is rotatably mounted in bearing members 120. The blade member 116 is rotatable within the cooperating blade slots 85, 105 of the respective first and second guard and divider members 72 and 74.

As shown in FIGS. 6 and 7, each blade member 116 is provided with a central section 122 and outer curved end section 124. The central section 122 is shown as having a hole 126 therein to receive and be secured to the mid-portion section of the blade support shaft 117. The outer curved end sections 124 are the cutting surfaces which cooperate with the blade slots 85, 105 of the first and second guard and divider members 72, 74.

As shown in FIG. 2, the drive assembly 114 includes an elongated driven shaft member 128 connected at one end by the universal joint connector to the output shaft 44 of the power drive means 29. The elongated driven shaft member 128 has a plurality of spaced worm gear assemblies 129 and support connectors 130. The driven shaft member 128 is extended the entire length of the support plate 53 and is rotatably mounted within the support connectors 130 which, in turn, are secured to the support plate 53 by bolt members 132.

The worm gear assemblies 129 each include a worm gear 134 mounted on the driven shaft member 128 for rotation therewith and operably connected to respective one's of the driven gear members 118 of the blade assembly 112. Adjacent ones of the respective worm gears 134 have the outer peripheral spirals extended in opposite directions so that adjacent one's of the blade members 116 rotate in opposite directions for reasons to be explained. As shown in FIG. 4, it is seen that the periphery of the worm gears 134 are matched to cooperate with the peripheral tooth members of the driven gear members 118 for proper timed operation.

In the use and operation of the power cutting means 12 of this invention as shown in FIG. 1, it is seen that the support and connector means 25 is first attachable to the three point hitch assembly 22 of the tractor structure 14. The power cutting means 12 connected in a substantial conventional manner with the laterally extended lug members 36 secured as by bolt members 39 to the linkage arms 24 of the three point hitch assembly 22. Additionally, the power drive means 29 is connected through the input shaft 40 and the universal joint member to the power take-off shaft 16 to provide the necessary power thereto as controlled by the control handles 20 on the tractor structure 14.

As seen in FIG. 1, the cutter means 27 is pivotally connected through the connector pin 55 to the support and connector means 25 and having the outer end thereof adapted to rest on the support surface 68 through the support runner 63. The output shaft 44 of the power drive means 29 is connected to the driven shaft members 128 of the cutter assembly 49 through the universal or universal joint connector. It is noted that only one power cutter means 12 is shown attached to the support and connector means 25 but it is obvious that an identical type structure could be attached to the opposite side of the support and connector means 25 so as to provide blade cutting action on both sides of the tractor structure 14 for greater cutting power.

As shown in FIG. 2, on providing power through the power drive means 29 to the cutter means 27, it is seen that the driven shaft member 128 is operable on rotation as shown by the arrow 136 to rotate the respective blade members 116 about vertical axes through rotation of the respective blade support shafts 117. The cooperating respective driven gear members 118 and worm gear 134 are such that adjacent blade members 116 are rotatable in opposite directions and are timed such so as to be non-interfering as shown by the arrows 139 and 141 in FIG. 2.

As shown in FIG. 3, it is shown that the blade members 116 are rotated within the blade slots 85, 105 of the respective first and second guard and divider members 72 and 74 so as to achieve a shearing action with the cooperating portions to provide an efficient and effective cutting operation. It is obvious as shown in FIG. 1, that the power cutting means 12 of this invention is operable through a cutting action whether moved in forward or rearward direction which is not achieved by the prior art devices. Additionally, the lower curved portions of the first and second guard and divider members 72, 74 are operable to be moved upwardly on hitting obstructions like rocks or other matter involved in cutting operations to prevent damage to the blade members 116.

It is seen that the power cutting means of this invention is readily attached to existing tractor structures and provides an efficient and effective cooperation between the blade assembly and its respective housing assembly to achieve cutting operations requiring a minimum amount of power. The pivotal connection of the cutter means relative to the support and connector means permits the same to be readily movable over obstructions and various terrains while achieving the cutting action as desired.

Additionally, the three point hitch assembly connection to the power cutting means allows the same to be movable vertically to regulate the height of material cut as desired.

It is seen that the power cutting means of this invention is readily attachable to existing tractor structures and movable through conventional hydraulic control handles to achieve the desired operation relative to the regulated vertical height and rotational speed of the blade member. The power cutting means is sturdy in construction, economical in power requirements, efficient in cutting operation, and durable in usage requiring little maintenance and service.

While the invention has been described in conjunction with preferred specific embodiments thereof, it will be understood that this description is intended to illustrate and not to limit the scope of the invention, which is defined by the following claims.

I claim:

1. A power cutting means adapted to be connected to a tractor structure having a power take-off shaft and a hitch assembly, comprising:
   a. a support and connector means connected to the hitch assembly of the tractor structure;
   b. a cutter means connected to said support and connector means;
   c. a power drive means operably connected to said cutter means and to the power take-off shaft to receive power therefrom;
   d. said cutter means including a basic support assembly connected to said support and connector means, a cutter assembly mounted on said basic support assembly, and a housing assembly connected to said basic support assembly;
   e. said cutter assembly including a blade assembly having a plurality of adjacent blade members rotating about respective vertical axes;
   f. said housing assembly having guard means secured to said basic support assembly about said blade members in an adjacent relationship,
   g. said blade members of a rectangular shape in transverse cross section; and
   h. said guard means including a plurality of first and second guard and divider members, each of a generally U-shape having a slot between upper and lower walls to receive respective one's of said blade members therein so that adjacent edges of said blade members and said guard means cooperate to form a cutting action,
   whereby when rotating, the blade members and said guard means cooperate to achieve a cutting action on crops directed between said guard means.

2. A power cutting means as described in claim 1, wherein:
   a. pairs of said first guard and divider members are axially aligned in direction of cutting movement, each having outer curved surfaces to engage a support surface to position said cutter assembly above the support surface during cutting operations and permit cutting operations regardless of direction of movement.

3. A power cutting means as described in claim 1, wherein:
   a. pairs of adjacent ones of said second guard and divider members are inclined laterally and joined at outer ends to form a pointed projection to divide and direct material being cut into said blade members.

4. A power cutting means as described in claim 1, wherein:
   a. said cutter assembly including a drive assembly connected to said power drive means;
   b. said drive assembly including an elongated driven shaft member having spaced gear assemblies connected to respective one's of said blade members for controlled, time rotation of said blade members;
   c. said gear assemblies, each having a worm gear operably connected to a driven gear member mounted on a blade support shaft which is connected to said blade member; and
   d. adjacent one's of said worm gears having reverse spirals to rotate adjacent one's of said blade members in opposite directions of rotation and in overlapping relationship.

5. A power cutting means as described in claim 1, wherein:
   a. pairs of respective one's of said first and second guard and divider members form an elongated slot therebetween to receive respective one's of said blade members therein in a close relationship;
   b. said blade members and respective adjacent one's of said first and second guard and divider members cooperate on rotation of said blade members to achieve a cutting action on material trained into said guard means;
   c. said power drive means having a gear box connected to an output shaft which is connected to said cutter assembly; and
   d. said cutter assembly having an elongated driven shaft connected to said output shaft and a plurality of spaced gear assemblies secured to said driven shaft and connected to respective one's of said blade members.

6. A power cutting means as described in claim 5, wherein:
   a. said blade members positioned on said basic support assembly in an overlapping relationship; and
   b. adjacent one's of said blade members rotatable in opposite directions having adjacent outer ends of said blade members timed 90° from each other.

* * * * *